United States Patent
Kim et al.

(10) Patent No.: US 9,223,370 B2
(45) Date of Patent: Dec. 29, 2015

(54) NEAR FIELD COMMUNICATION DEVICE OPERATING IN MULTIPLE BATTERY MODES AND POWER MANAGEMENT METHOD OF ELECTRONIC APPARATUS COMPRISING THE SAME

(71) Applicant: Samsung Electronics Co., Ltd., Suwon-si, Gyeonggi-do (KR)

(72) Inventors: Myunggun Kim, Seoul (KR); HyukJun Sung, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 350 days.

(21) Appl. No.: 13/804,878

(22) Filed: Mar. 14, 2013

(65) Prior Publication Data

US 2013/0332756 A1     Dec. 12, 2013

(30) Foreign Application Priority Data

Jun. 7, 2012    (KR) ........................ 10-2012-0061130

(51) Int. Cl.
*G06F 1/26*      (2006.01)
*G06F 1/32*      (2006.01)

(52) U.S. Cl.
CPC .............. *G06F 1/263* (2013.01); *G06F 1/3234* (2013.01); *G06F 1/3296* (2013.01); *Y02B 60/1285* (2013.01)

(58) Field of Classification Search
CPC ........ G06F 1/32; G06F 1/3212; G06F 1/3287
USPC ............ 713/320, 323, 300; 455/343.1, 343.2
See application file for complete search history.

(56) References Cited

U.S. PATENT DOCUMENTS

| | | | |
|---|---|---|---|
| 7,539,508 B2 | 5/2009 | Bahl et al. | |
| 7,688,270 B2* | 3/2010 | Tsushima | ...................... 343/788 |
| 7,706,771 B2 | 4/2010 | Rofougaran | |
| 7,822,404 B2 | 10/2010 | Choi et al. | |
| 8,116,682 B2 | 2/2012 | Chang | |
| 8,326,224 B2* | 12/2012 | Butler | ........................... 455/41.1 |
| 8,626,066 B2* | 1/2014 | Geslin et al. | .................. 455/41.2 |
| 8,811,897 B2* | 8/2014 | Matsumoto et al. | ......... 455/41.1 |
| 8,855,563 B2* | 10/2014 | Yamaoka et al. | ............. 455/41.2 |
| 2008/0278136 A1 | 11/2008 | Murtojarvi | |
| 2009/0102672 A1 | 4/2009 | Petek et al. | |
| 2009/0150704 A1* | 6/2009 | Van Bosch | ..................... 713/340 |
| 2010/0197365 A1 | 8/2010 | Ripley et al. | |
| 2010/0291871 A1* | 11/2010 | Butler | ........................... 455/41.1 |
| 2012/0252363 A1* | 10/2012 | Zhang et al. | ................. 455/41.1 |

* cited by examiner

*Primary Examiner* — Chun Cao
(74) *Attorney, Agent, or Firm* — Lee & Morse, P.C.

(57) ABSTRACT

A near field communication device includes an RF power unit that generates an RF power supply voltage through wireless communication with an external communication device, a power detecting unit that detects an output level of a battery connected to the near field communication device, a driving control unit that controls the near field communication device, and a switching control unit that controls a supply of a power supply voltage to the driving control unit from the RF power unit or the battery. The switching control unit controls the supply of the power supply voltage based on at least one of the output level of the battery, a power on/off state of an electronic apparatus including the near field communication device, whether the electronic apparatus is connected to the battery, and whether the RF power supply voltage is generated.

20 Claims, 9 Drawing Sheets

Fig. 9

NEAR FIELD COMMUNICATION DEVICE OPERATING IN MULTIPLE BATTERY MODES AND POWER MANAGEMENT METHOD OF ELECTRONIC APPARATUS COMPRISING THE SAME

CROSS-REFERENCE TO RELATED APPLICATIONS

The present application claims priority under 35 U.S.C. §119 to Korean Patent Application No. 10-2012-0061130, filed on Jun. 7, 2012, in the Korean Intellectual Property Office, and entitled: "Near Field Communication Device And Power Management Method Of Electronic Apparatus Comprising The Same," which is incorporated by reference herein in its entirety.

BACKGROUND

1. Field

Embodiments relate to a near field communication device and a power management method of an electronic apparatus including the same.

2. Description of the Related Art

A near field communication (hereinafter, referred to as NFC) technique may be a communication technique for data communications between neighboring devices. The NFC technique may be applied to a mobile device, a personal computer, a digital camera, and so on. In recent years, as a mobile device (e.g., a smart phone) is widely used, there may a desire for using the mobile device as a payment means via the fusion of the mobile device and the NFC technique.

SUMMARY

Embodiments are directed to a near field communication device, including an RF power unit that generates an RF power supply voltage through wireless communication with an external communication device, a power detecting unit that detects an output level of a battery connected to the near field communication device, a driving control unit that controls the near field communication device, and a switching control unit that controls a supply of a power supply voltage to the driving control unit from the RF power unit or the battery. The switching control unit may control the supply of the power supply voltage based on at least one of the output level of the battery, a power on/off state of an electronic apparatus including the near field communication device, whether the electronic apparatus is connected to the battery, and whether the RF power supply voltage is generated. The switching control unit may block the supply of the power supply voltage to the driving control unit from the RF power unit when the electronic apparatus is in a power off state, the electronic apparatus is connected with the battery, and the RF power supply voltage is generated.

The switching control unit may control a first switch forming a supply path from the RF power unit to the driving control unit and a second switch forming a supply path from the battery to the driving control unit, and when the electronic apparatus is in the power off state, the electronic apparatus is connected with the battery, and the RF power supply voltage is not generated, the first switch may be closed and the second switch may be opened.

The switching control unit may control the first and second switches in response to at least one of first to fourth control signals, the first control signal may be generated by detecting the output level of the battery, the second control signal may be generated by detecting the power on/off state of the electronic apparatus, the third control signal may be generated by detecting whether the electronic apparatus is connected with the battery, and the fourth control signal may be generated by detecting whether the RF power supply voltage is generated.

When the electronic apparatus is in the power off state, the battery is connected with the electronic apparatus, and the RF power supply voltage is generated, the switching control unit may open the first switch and may close the second switch.

When the electronic apparatus is in a power on state, the battery is connected with the electronic apparatus, and the output level of the battery is higher than a reference voltage, the switching control unit may open the first switch and may close the second switch.

When the electronic apparatus is in the power off state and the battery is not connected with the electronic apparatus, the switching control unit may close the first switch and may open the second switch.

The near field communication device may further include a power control unit that controls whether the power supply voltage is supplied to the driving control unit from the RF power unit or the battery, when the first and second switches are closed.

When the first switch is closed and the second switch is opened, the driving control unit may control a power supply voltage supplied to the power detecting unit.

Embodiments are also directed to a power management method of an electronic apparatus including a near field communication device, the method including blocking a supply of power from a battery to the near field communication device when the electronic apparatus is connected with the battery, the electronic apparatus is powered off, and an RF power supply voltage of the near field communication device is not generated, and deciding a power supply mode of the near field communication device in response to at least one of an output level of the battery, a power on/off state of the electronic apparatus, and a generation of the RF power supply voltage.

Deciding the power supply mode of the near field communication device may include setting the power supply mode to a battery off mode when the battery is not connected with the electronic apparatus.

Deciding the power supply mode of the near field communication device may include setting the power supply mode to a battery on mode when the electronic apparatus is in a power on state and the output level of the battery is higher than a reference voltage.

Deciding the power supply mode of the near field communication device may include setting the power supply mode to a battery off mode when the output level of the battery is lower than a reference voltage.

Deciding the power supply mode of the near field communication device may include setting the power supply mode to a low battery mode when the RF power supply voltage is generated.

When the electronic apparatus is in a power on state and the output level of the battery is higher than a reference voltage, the power supply mode of the near field communication device may be set to a battery on mode from a state where the near field communication device operates in the low battery mode.

When the output level of the battery is lower than a reference voltage, the power supply mode of the near field communication device may be set to a battery off mode from a state where the near field communication device operates in the low battery mode.

Embodiments are also directed to a near field communication device, including an RF power unit that generates an RF power supply voltage through wireless communication with an external communication device, a driving control unit that controls the near field communication device, and a switching control unit that controls a first switch and a second switch, the first switch forming a supply path from the RF power unit to the driving control unit and the second switch forming a supply path from a battery to the driving control unit. The switching control unit may close the first switch and may open the second switch when an electronic apparatus connected to the near field communication device is in a power off state, the electronic apparatus is connected with the battery, and the RF power supply voltage is not generated.

The switching control unit may open the first switch and may close the second switch when the electronic apparatus is in the power off state, the electronic apparatus is connected with the battery, an output level of the battery is higher than a reference voltage, and the RF power supply voltage is generated.

The switching control unit may open the first switch and may close the second switch when the electronic apparatus in a power on state.

The switching control unit may close the first switch and may open the second switch when the electronic apparatus is not connected with the battery, or an output level of the battery is lower than a reference voltage.

The near field communication device may further include a power control unit and the power control unit may be between the first switch and the driving control unit and may be between the second switch and the driving control unit. When the first switch and the second switch are closed, the power control unit may supply the driving control unit with power from the second switch and may not supply the driving control unit with power from the first switch.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Unless otherwise noted, like reference numerals denote like elements throughout the attached drawings and written description, and thus descriptions will not be repeated.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular exemplary embodiments only and is not intended to limit the embodiments. As used herein, the singular forms "a", "an" and "the" are intended to include the plural forms as well, unless the context clearly indicates otherwise. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of skill in the art. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
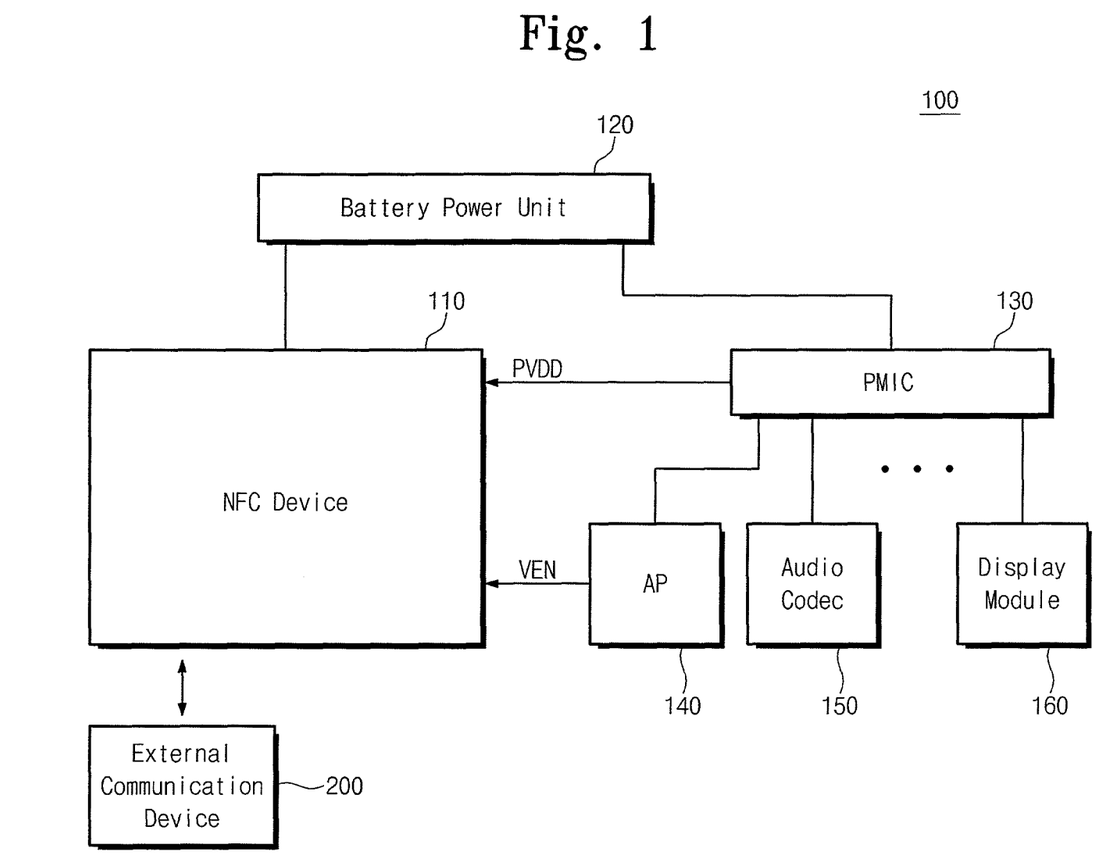
FIG. 1 illustrates a block diagram of an electronic apparatus including a near field communication device according to an embodiment.

FIG. 1 illustrates a block diagram schematically of an electronic apparatus including a near field communication device according to an embodiment. In FIG. 1, there is illustrated an example of a mobile communication terminal. However, the electronic apparatus may be a suitable electronic apparatus other than a mobile communication terminal. An electronic apparatus may be understood to include all electronic apparatuses performing wireless communication with an external communication device including a near field communication (hereinafter, referred to as NFC).

Referring to FIG. 1, an electronic apparatus 100 according to an embodiment may include an NFC device 110, a battery power unit 120, a power management integrated circuit (PMIC) 130, an application processor (AP) 140, an audio codec 150, and a display module 160.

The NFC device 110 may communicate with an external communication device 200 using an NFC manner.

The battery power unit 120 may be disposed inside the electronic apparatus 100, and may power the NFC device 110 and other components of the electronic apparatus 100. In particular, the battery power unit 120 may provide a power supply voltage to other components of the electronic apparatus 100 via the power management integrated circuit 130. The power management integrated circuit 130 may be connected with the battery power unit 120, and may control a power supply voltage supplied from the battery power unit 120 to other components of the electronic apparatus 100 such as the application processor 140, the audio codec 150, and the display module 160.

The NFC device 110 may be supplied directly with the power supply voltage from the battery power unit 120. The reason may be that the NFC device 110 may have to perform wireless communication with the external communication device 200 when the electronic apparatus 100 is powered off. In this case, consumption of the power supply voltage of the battery power unit 120 may increase.

In the NFC device 110 according to an embodiment, a power supply mode may be controlled according to whether the electronic apparatus 100 is powered off or on, whether the electronic apparatus 100 is connected with the battery power unit 120, a state of a power supply voltage of the battery power unit 120, and whether an RF power supply voltage of the NFC device 110 is active.

In detail, the NFC device 110 may be set to a low battery reset mode when an RF power supply voltage is not generated and the battery power unit 120 is connected to the electronic apparatus 100 with the electronic apparatus 100 being powered off. The case that the battery power unit 120 is connected to the electronic apparatus 100 with the electronic apparatus 100 being powered off may correspond to the case that, before the electronic apparatus 100 is used, the battery power unit 120 is connected to the electronic apparatus 100. Also, the case that the battery power unit 120 is connected to the electronic apparatus 100 with the electronic apparatus 100 being powered off may correspond to the case that the electronic apparatus 100 is powered off after operating in a power-on state where the battery power unit 120 is connected to the electronic apparatus 100. The low battery reset mode may be understood to be a state where a power supply voltage supplied from the battery power unit 120 to the NFC device 110 is interrupted. This will be more fully described later.

With the above description, the electronic apparatus 100 including the NFC device 110 may extend a life of the battery power unit 120 by reducing a power consumed by the NFC device 110.

Figure 2:
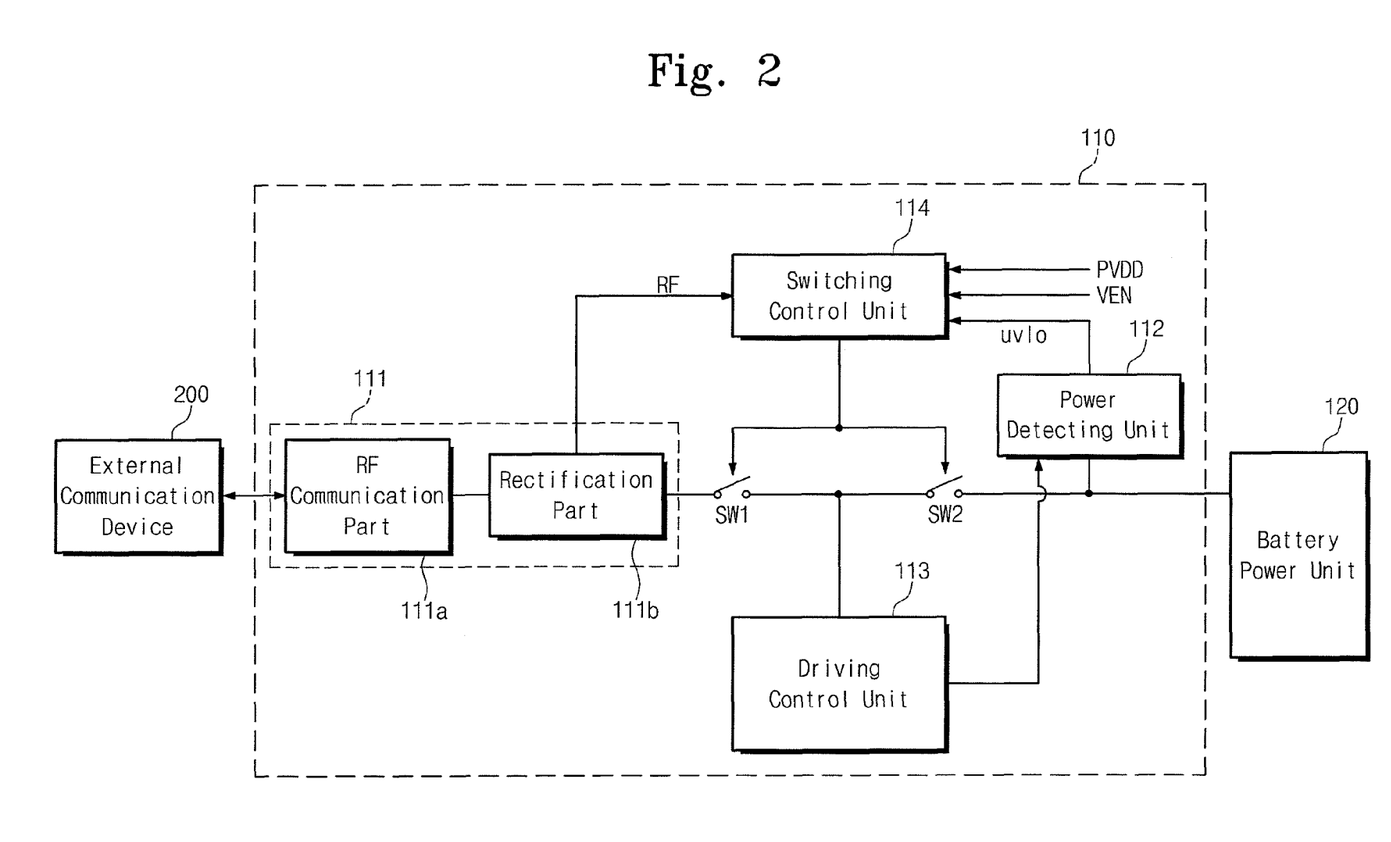
FIG. 2 illustrates a block diagram of an NFC device according to an embodiment.

FIG. 2 illustrates a block diagram of an NFC device according to an embodiment. Referring to FIG. 2, an NFC device 110 according to an embodiment may include an RF power unit 111, a power detecting unit 112, a driving control unit 113, a switching control unit 114, a first switch SW1, and a second switch SW2. The RF power unit 111 may include an RF communication part 111a and a rectification part 111b.

The RF communication part 111a may perform wireless communication with an external communication device 200. The RF communication part 111a may communicate with the external communication device 200 using an NFC manner, for example. The RF power unit 111 may perform wireless communication with the external communication device 200 with the RF power unit 111 being spaced apart from the external communication device 200. For example, a distance between the external communication device 200 and the RF power unit 111 may be within about 10 centimeters.

The RF communication part 111a may operate in a reader mode, a card mode, or a P2P mode. In the reader mode, for example, the RF communication part 111a may operate as a component to receive data from the external communication device 200. In the card mode, for example, the RF communication part 111a may operate as a component to transmit data to the external communication device 200. In the P2P mode, for example, the RF communication part 111a may operate in a communication manner for transmitting and receiving data to and from another electronic apparatus including the NFC device 110.

The rectification part 111b may generate a DC signal from an RF signal received through the RF communication part 111a. The rectification part 111b may receive an induced current (e.g., an alternative current voltage) generated through an alternative current magnetic field generated by an inductively coupled manner between the RF communication part 111a and the external communication device 200. The rectification part 111b may rectify the induced current to generate the DC signal (e.g., a DC voltage). The rectification part 111b may be formed of an AC/DC converter or a voltage rectifier, for example.

The power detecting unit 112 may detect an electric signal of the battery power unit 120 to generate a first control signal uvlo. The electric signal may be a voltage of the battery detecting unit 120, for example. In detail, the power detecting unit 112 may detect whether a voltage of the battery power unit 120 is higher than a reference voltage. If a voltage of the battery power unit 120 is higher than the reference voltage, the power detecting unit 112 may provide the switching control unit 114 with the first control signal uvlo having a logical low level. If a voltage of the battery power unit 120 is lower than the reference voltage, the power detecting unit 112 may provide the switching control unit 114 with the first control signal uvlo having a logical high level. The power detecting unit 112 may be configured to include an under voltage lockout (UVLO) circuit, for example.

The driving control unit 113 may control an overall operation of the NFC device 110. For example, although not shown in FIG. 2, the driving control unit 113 may include a CPU, a timer, and so on. The CPU may perform computation needed to drive the NFC device 110, input/output control, and so on. The CPU may control the power detecting unit 112. This will be more fully described with reference to FIG. 3.

The switching control unit 114 may control the first and second switches SW1 and SW2 such that a power supply voltage is supplied from the RF power unit 111 or the battery power unit 120 to the driving control unit 113. For example, the switching control unit 114 may control the first and second switches SW1 and SW2 in response to at least one of the first control signal uvlo, a second control signal PVDD, a third control signal VEN, and a fourth control signal RF. The second control signal PVDD may be a signal that is generated by detecting a power on/off state of an electronic apparatus 100 including the NFC device 110. The third control signal VEN may be a signal that is generated by detecting whether a battery power unit 120 is connected with the electronic apparatus 100 including the NFC device 110. The fourth control signal RF may be a signal that is generated by detecting whether an RF power supply voltage is generated.

Below, the first to fourth control signals uvlo, PVDD, VEN, and RF will be described in more detail.

As described above, the first control signal uvlo may be generated from the power detecting unit 112, and may be transferred to the switching control unit 114.

The second control signal PVDD may be generated from a power management integrated circuit 130 of the electronic apparatus 100, and may be provided to the switching control unit 114. However, the embodiments are not limited thereto. A suitable signal indicating a power on/off state of the electronic apparatus 100 may be used as the second control signal. For example, the second control signal PVDD may have a logic high level when the electronic apparatus 100 is in a power-on state and a logic low level when the electronic apparatus 100 is in a power-off state.

The third control signal VEN may be generated from an application processor 140 of the electronic apparatus 100, and may be provided to the switching control unit 114. However, the embodiments are not limited thereto. A suitable signal indicating whether the battery power unit 120 is connected to the electronic apparatus 100 may be used as the third control signal. For example, the third control signal VEN may have a logic high level when the battery power unit 120 is connected to the electronic apparatus 100 and a logic low level when the battery power unit 120 is disconnected from the electronic apparatus 100.

The fourth control signal RF may be generated from the rectification part 111*b*, and may be provided to the switching control unit 114. The switching control unit 114 may detect whether the RF power supply voltage is generated, using the fourth control signal RF. For example, the fourth control signal RF may have a logic high level when the RF power supply voltage is generated and a logic low level when the RF power supply voltage is not generated.

Referring to FIG. 2, one end of the first switch SW1 may be connected with the RF power unit 111, and the other end thereof may be connected with one end of the second switch SW2. The other end of the second switch SW2 may be connected with the power detecting unit 112 and the battery power unit 120. The driving control unit 114 may be connected with the other end of the first switch SW1 and the one end of the second switch SW2. The switching control unit 130 may be connected with the rectification part 111*b* and the power detecting unit 112. When the first switch SW1 is closed, the driving control unit 114 may be supplied with a power supply voltage from the RF power unit 111. When the second switch SW2 is closed, the driving control unit 114 may be supplied with a power supply voltage from the battery power unit 120.

As described above, the NFC device 110 may block a supply of a power supply voltage from the battery power unit 120 according to a power on/off state of the electronic apparatus 100, whether the battery power unit 120 is connected with the electronic apparatus 100, an output level of the battery power unit 120, and whether the RF power supply voltage is generated in the NFC device 110. This will be more fully described with reference to FIGS. 3 to 5.

Figure 3:
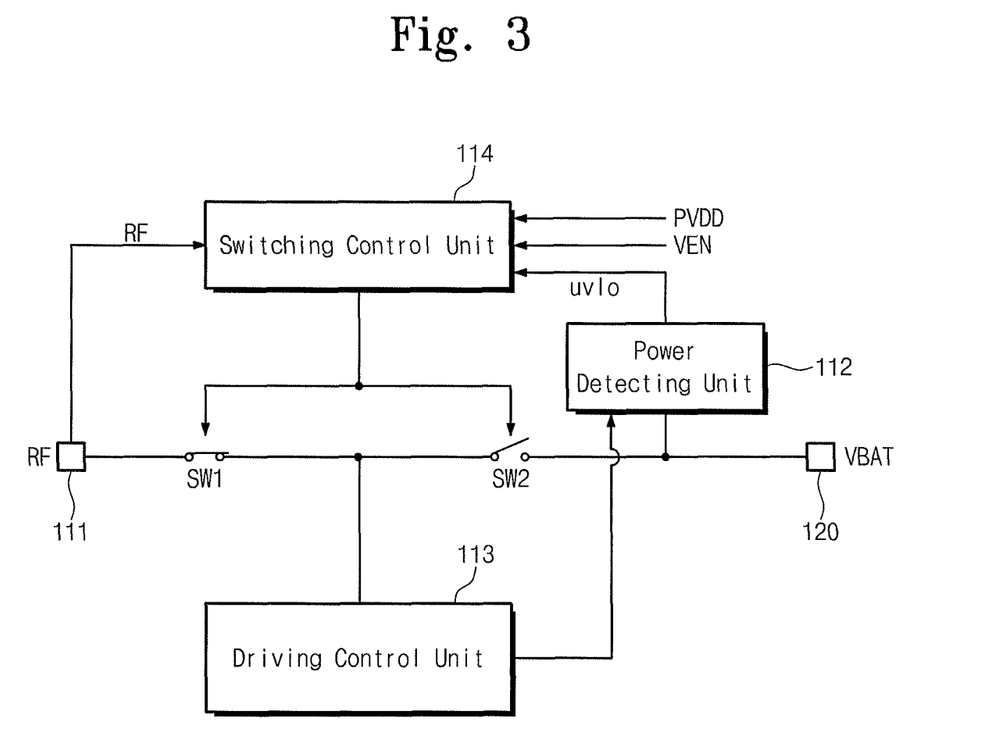
FIGS. 3 to 5 illustrate diagrams for describing an operation of an NFC device according to an embodiment.
Figure 4:
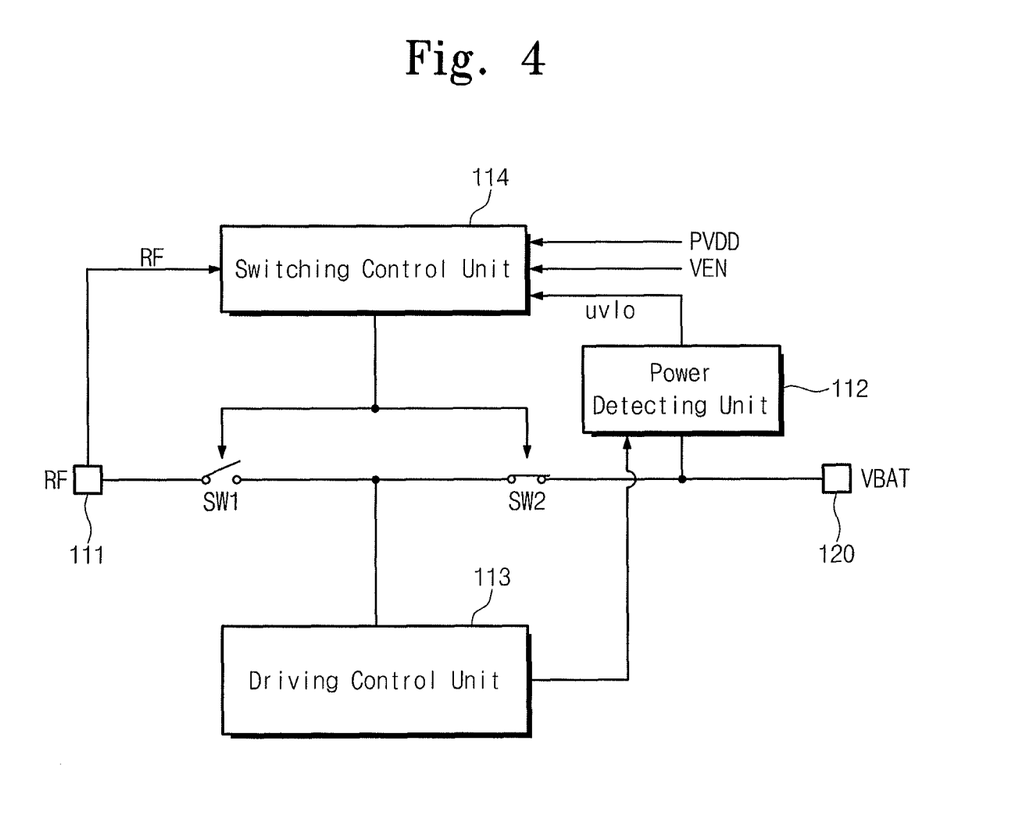
Figure 5:
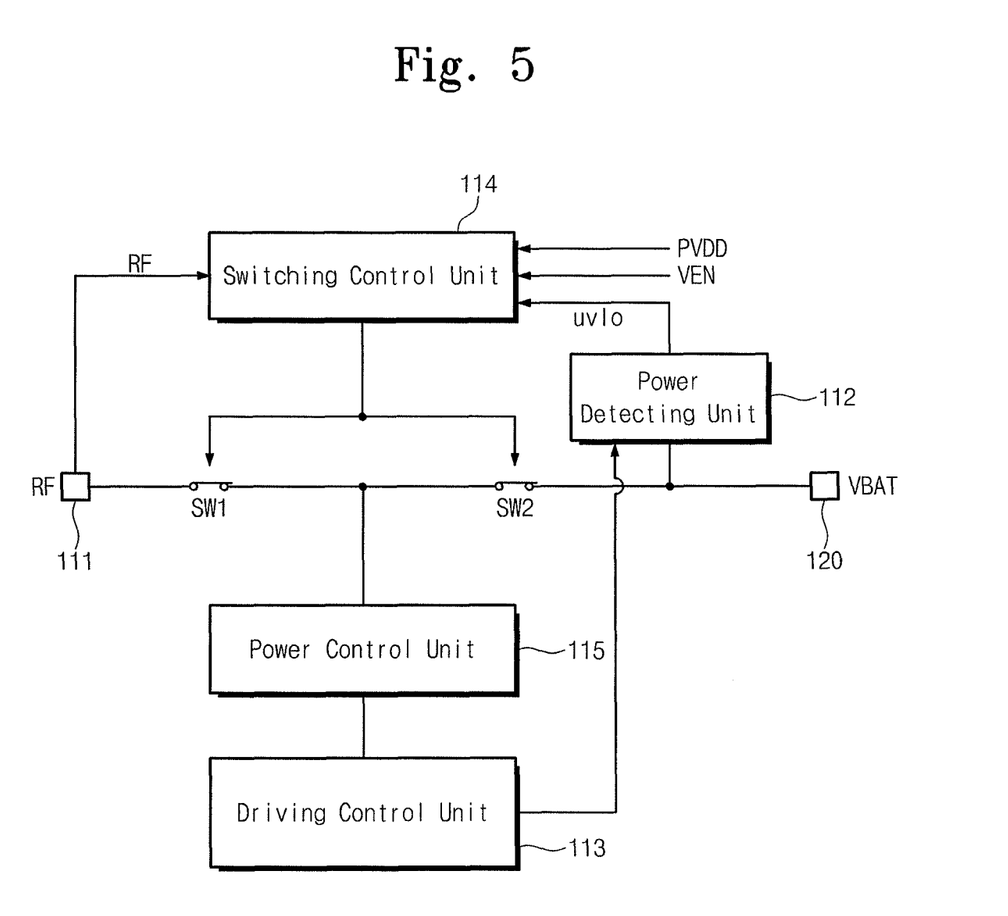

FIGS. 3 to 5 illustrate diagrams for describing an operation of an NFC device according to an embodiment.

FIG. 3 illustrates a diagram for describing a case that an NFC device 110 operates in a low battery reset mode or a battery off mode.

The NFC device 110 may be set to the low battery reset mode when an electronic apparatus 100 is in a power-off state, a battery power unit 120 is connected with the electronic apparatus 100, and no RF power supply voltage is generated.

In the above-described case, a switching control unit 114 may be provided with a second control signal PVDD having a logic low level from a power management integrated circuit 130. Also, the switching control unit 114 may be provided with a third control signal VEN having a logic high level from an application processor 140 and a fourth control signal RF having a logic low level from an RF power unit 111. In this case, an operation of the switching control unit 114 may be independent with respect to the first control signal uvlo (e.g., the first control signal uvlo may not affect the switching control unit 114 in this case). A first switch SW1 may be closed under a control of the switching control unit 114 according to the second to fourth control signals PVDD, VEN, and RF. Also, a second switch SW2 may be opened under a control of the switching control unit 114 according to the second to fourth control signals PVDD, VEN, and RF.

Thus, a driving control unit 113 of the NFC device 110 may not be supplied with a power supply voltage from the battery power unit 120 and the RF power unit 111. In this case, the power detecting unit 112 may be set to an off state according to a control of the driving control unit 113. That is, in the low battery reset mode, all components of the NFC device 110 may be set to an off state. As a result, it is possible to increase a usable time (or life) of the battery power unit 120 when the NFC device 110 operates in the low battery reset mode.

Meanwhile the NFC device 110 may be set to a battery off mode when the electronic apparatus 100 is in a power-off state, the battery power unit 120 is not connected with the electronic apparatus 100, and the RF power supply voltage is generated.

In the above-described case, the switching control unit 114 may be provided with the second control signal PVDD having a logic low level, the third control signal VEN having a logic low level, and the fourth control signal RF having a logic high level. In this case, an operation of the switching control unit 114 may be may be independent with respect to the first control signal uvlo (e.g., the first control signal uvlo may not affect the switching control unit 114 in this case). The first switch SW1 may be closed under a control of the switching control unit 114 according to the second to fourth control signals PVDD, VEN, and RF. Also, the second switch SW2 may be opened under a control of the switching control unit 114 according to the second to fourth control signals PVDD, VEN, and RF.

Thus, a power supply voltage may not be supplied from the battery power unit 120 to the NFC device 110. That is, in the case that the NFC device 110 operates in the battery off mode, the driving control unit 113 may be supplied with the RF power supply voltage as an operating voltage.

FIG. 4 illustrates a diagram for describing a case that the NFC device 110 operates in a low battery mode, a battery on mode, or a standby mode.

The NFC device 110 may be set to the low battery mode when the electronic apparatus 100 is a power off mode, the battery power unit 120 is connected with the electronic apparatus 100, a voltage of the battery power unit 120 is higher than a reference voltage, and RF power supply voltage is generated.

In the above-described case, the switching control unit 114 may be provided with the first control signal uvlo having a logic low level, the second control signal PVDD having a logic low level, the third control signal VEN having a logic high level, and the fourth control signal RF having a logic high level. The first switch SW1 may be opened under a control of the switching control unit 114 according to the first to fourth control signals uvlo, PVDD, VEN, and RF. Also, the second switch SW2 may be closed under a control of the switching control unit 114 according to the first to fourth control signals uvlo, PVDD, VEN, and RF.

Thus, the NFC device 110 may be supplied with a power supply voltage from the battery power unit 120. In the case that a power supply voltage is supplied from both the RF power unit 111 and the battery power unit 120, a power supply voltage from the battery power unit 120 may be supplied to the driving control unit 113 for a stable operation of the NFC device 110.

In the case that a mode of the NFC device 110 is switched from the low battery reset mode to the low battery mode, the driving control unit 113 may detect generation of the RF power supply voltage to set the power detecting unit 112 to a power on state.

The NFC device 110 may be set to the battery on mode when the electronic apparatus 100 is a power on mode, the battery power unit 120 is connected with the electronic apparatus 100, and a voltage of the battery power unit 120 is higher than a reference voltage.

In the above-described case, the switching control unit 114 may be provided with the first control signal uvlo having a logic low level, the second control signal PVDD having a logic high level, the third control signal VEN having a logic high level. In this case, an operation of the switching control unit 114 may be independent with respect to the fourth control signal RF (e.g., the fourth control signal RF may not affect the switching control unit 114 in this case). The first switch SW1 may be opened under a control of the switching control unit 114 according to the second to fourth control signals PVDD, VEN, and RF. Also, the second switch SW2 may be closed under a control of the switching control unit 114 according to the second to fourth control signals PVDD, VEN, and RF. Thus, the NFC device 110 may be supplied with a power supply voltage from the battery power unit 120. That is, in the case that the NFC device 110 operates in the battery on mode, the driving control unit 113 may be supplied with a power supply voltage from the battery power unit 120 as an operating voltage.

Meanwhile, a mode of the NFC device 110 may be switched from the battery on mode or low battery mode to the standby mode. In the case that the NFC device 110 operates in the standby mode, the first switch SW1 may be opened and the second switch SW2 may be closed.

The NFC device 110 may be set to the standby mode when no RF power supply voltage is generated during an operation where the NFC device 110 operates in the low battery mode. For example, the RF power supply voltage may not be generated when the NFC device 110 gets out of a range where it can communicate with an external communication device 200. Also, the NFC device 110 may be set to the standby mode when a reference time elapses during operating in the low battery mode. At this time, a timer (not shown) of the driving control unit 113 may detect whether a reference time elapses. Also, the NFC device 110 may be set to the battery on mode or the standby mode according to a control (e.g., a command) of a CPU (not shown).

FIG. 5 illustrates a diagram for describing example in which the switching control unit 114 of the NFC device 110 closes the first and second switches SW1 and SW2.

The switching control unit 114 may close both the first switch SW1 and the second switch SW2 when the RF power supply voltage is generated while the NFC device 110 operates in the battery on mode. That is, the switching control unit 114 may close both the first switch SW1 and the second switch SW2 when the fourth control signal RF having a logic high level is received while the NFC device 110 operates in the battery on mode.

Also, as illustrated in FIG. 5, the NFC device 110 according to an embodiment may further includes a power control unit 115.

The power control unit 115 may select a power supply voltage transferred to the driving control unit 113 when the first and second switches SW1 and SW2 are closed. The power supply voltage may include a power supply voltage transferred from the RF power unit 111 and/or a power supply voltage transferred from the battery power unit 120. That is, the power control unit 115 may select a power supply voltage transferred from the RF power unit 111 and/or a power supply voltage transferred from the battery power unit 120, to provide the selected power supply voltage to the driving control unit 113. In example embodiments, the power control unit 115 may select a power supply voltage transferred from the battery power unit 120, to provide the selected power supply voltage to the driving control unit 113. The reason may be that it is possible to drive the NFC device 110 more stably.

Figure 6:
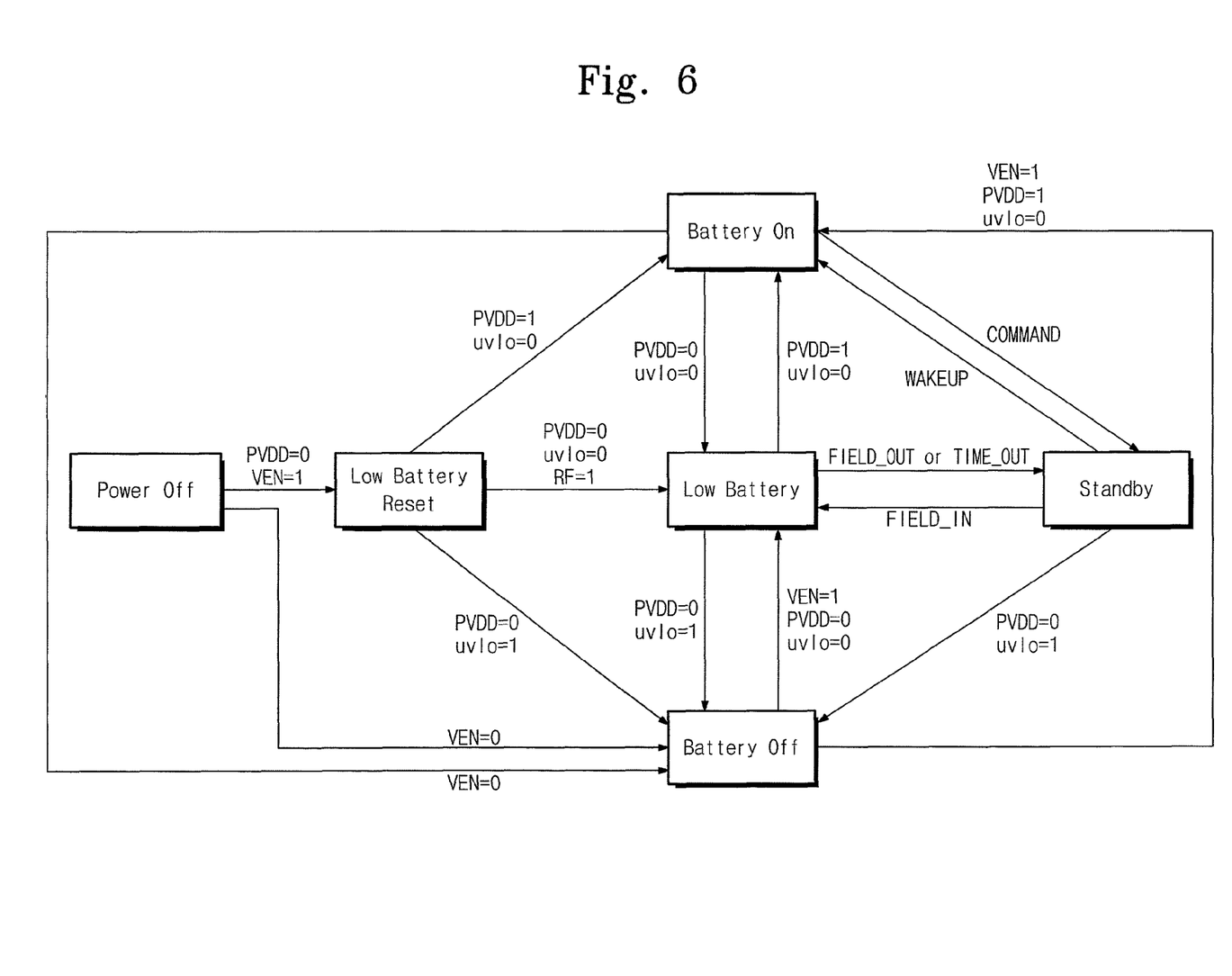
FIG. 6 illustrates a state diagram of a power management method of an electronic apparatus including an NFC device according to an embodiment.

FIG. 6 illustrates a state diagram of a power management method of an electronic apparatus including an NFC device according to an embodiment. Below, the electronic apparatus 100 may be initially in a power off state.

Referring to FIG. 6, a power management method of an electronic apparatus including an NFC device according to an embodiment may set a power supply mode of an NFC device 110 to a low battery reset mode when an electronic apparatus 100 is in a power off state, a battery power unit 120 is connected to the electronic apparatus 100, and an RF power supply voltage is not generated. The low battery reset mode may mean a power supply mode in which a power supply voltage supplied from the battery power unit 120 to the NFC device 110 is blocked. That is, in the case that the NFC device 110 operates in the low battery reset mode, current consumption of the electronic apparatus 100 including the NFC device 110 may be minimized. The reason, as described above, may be that a power supply voltage is not supplied to a driving control unit 113 and/or a power detecting unit 112 of the NFC device 110.

Meanwhile the power management method of an electronic apparatus including an NFC device according to an embodiment may set a power supply mode of the NFC device 110 to a battery off mode. In the battery off mode, the NFC device 110 may operate using a power supply voltage from the RF power unit 111, not a power supply voltage from the battery power unit 120.

Below, there may be described a process of setting a power supply voltage of the NFC device 110 in response to at least one of whether the electronic apparatus 100 is in a power on state, whether the battery power unit 120 is connected with the electronic apparatus 100, an output level of the battery power unit 120, and whether an RF power supply voltage of the NFC device 110 is generated.

In the case that the RF power supply voltage is generated, a power supply mode of the NFC device 110 may be set to a low battery mode. The low battery mode may be understood to be a power supply mode in which, although the NFC device 110 is supplied with power supply voltages from the battery power unit 120 and the RF power unit 111, it operates using the power supply voltage from the battery power unit 120.

According to an embodiment a power supply mode of the NFC device 110 may be set to a battery on mode when the electronic apparatus 100 is in a power on state and an output level of the battery power unit 120 is higher than a reference voltage.

The battery on mode may be understood to be a power supply mode in which the NFC device 110 operates using a power supply voltage of the battery power unit 120 in a state where the electronic apparatus 100 is powered on.

In example embodiments, a power supply mode of the NFC device 110 may be set to a battery off mode when an output level of the battery power unit 120 is lower than the reference voltage.

In example embodiments, a power supply mode of the NFC device 110 may be set to a battery on mode when the electronic apparatus 100 is in a power on state.

In example embodiments, a power supply mode of the NFC device 110 may be set to a standby mode when an RF power supply voltage is not generated, for example, when the NFC device 110 gets out of a range where it can communicate with an external communication device 200.

In example embodiments, a power supply mode of the NFC device 110 may be set to the standby mode when a reference time elapses in a state where the NFC device 110 operates in a low battery mode. It is possible to check whether a reference time elapses, using a timer of a driving control unit 113 described with reference to FIG. 2.

The NFC device 110 may be set to a low battery mode when the electronic apparatus 100 is in a power off state (in the case that a power is off).

In example embodiments, the NFC device 110 may be set to the standby mode according to a control (e.g., a command) of a CPU (not shown) of the driving control unit 113 in the NFC device 110.

In example embodiments, the NFC device 110 may be set to a battery off mode when the battery power unit 120 is detached from the electronic apparatus 100.

In example embodiments, a power supply mode of the NFC device 110 may be set to a low battery mode when the NFC device 110 enters a range where it can communicate with the external communication device 200.

In example embodiments, the NFC device 110 may be set to a battery off mode when the electronic apparatus 100 is in a power off state and an output level of the battery power unit 120 is lower than a reference voltage.

In example embodiments, the NFC device 110 may be set to a battery on mode according to a control WAKEUP of the CPU of the driving control unit 113 in the NFC device 110 described with reference to FIG. 2.

In example embodiments, the NFC device 110 may be set to a low battery mode when the battery power unit 120 is connected to the electronic apparatus 100 and an output level of the battery power unit 120 is higher than a reference voltage.

In example embodiments, the NFC device 110 may be set to a battery on mode when the battery power unit 120 is connected to the electronic apparatus 100, an output level of the battery power unit 120 is higher than a reference voltage, and the electronic apparatus 100 is powered on.

Figure 7:
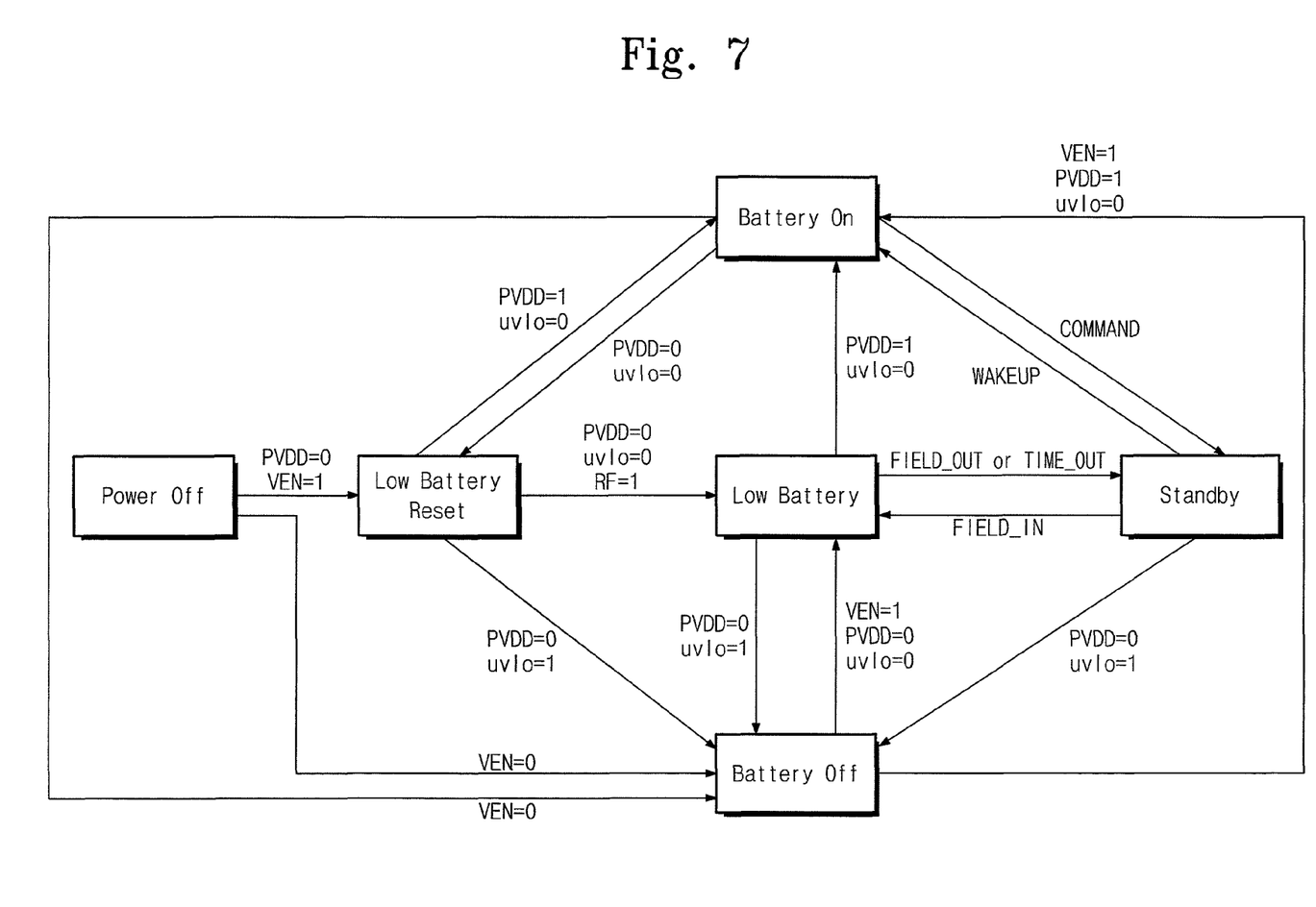
FIG. 7 illustrates a state diagram of a power management method of an electronic apparatus including an NFC device according to an embodiment.

FIG. 7 illustrates a state diagram of a power management method of an electronic apparatus including an NFC device according to an embodiment. Switching among modes of operation may be the same as described with reference to FIG. 6, except for the following difference.

As illustrated in FIG. 7, an NFC device 110 may be set to a low battery reset mode when an electronic apparatus 110 is powered off from a state where the NFC device 110 operates in a battery on mode.

In the above-described case, if the NFC device 110 is set to a low battery reset mode, not directly to a low battery mode, it is possible to extend a usable time (or, a life) of a battery power unit 120. In addition, it is possible to reduce current consumption of the electronic apparatus 100.

Figure 8:
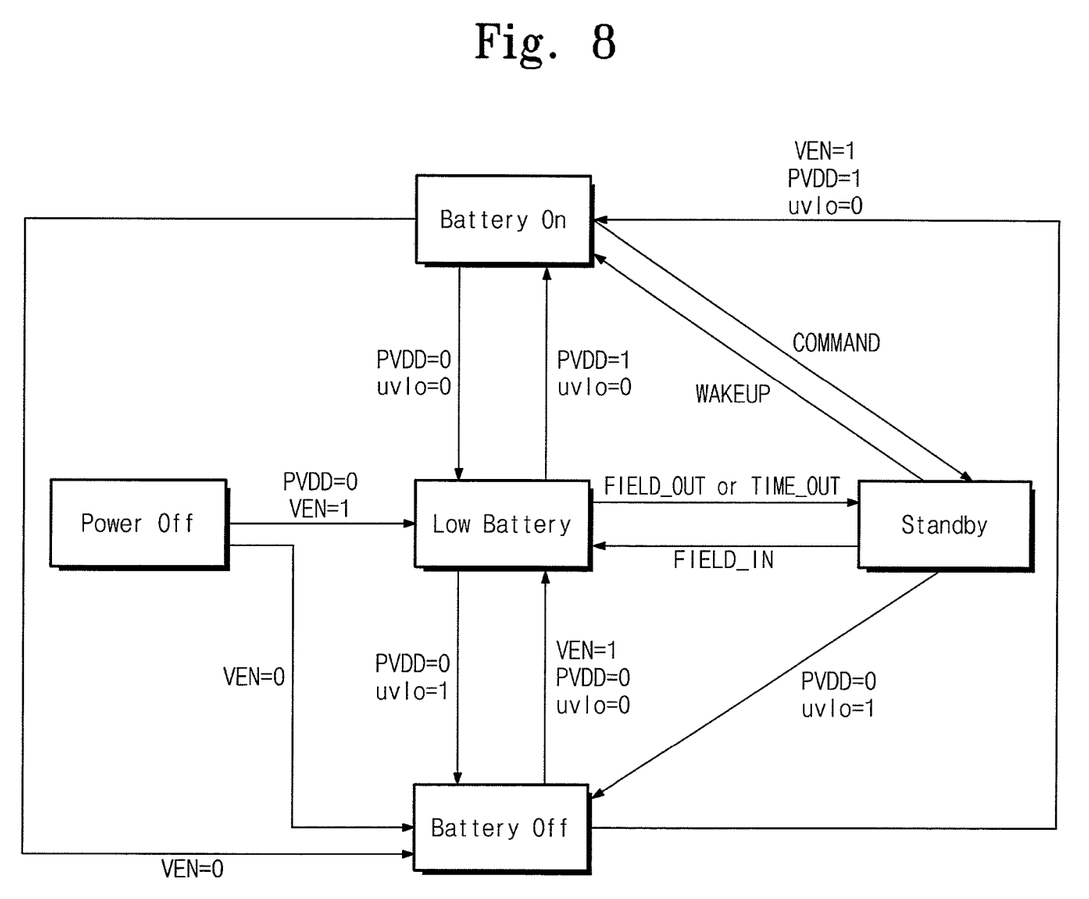
FIG. 8 illustrates a state diagram of a power management method of an electronic apparatus including an NFC device according to an embodiment.

FIG. 8 illustrates a state diagram of a power management method of an electronic apparatus including an NFC device according to an embodiment. Switching among modes of operation may be the same as described with reference to FIG. 6, except for the following difference.

As illustrated in FIG. 8, an NFC device 110 according to an embodiment may operate without setting to a low battery reset mode. That is, the NFC 110 may be set to a low battery mode when an electronic apparatus 100 including the NFC device 110 is powered off, a battery power unit 120 is connected to the electronic apparatus 100, and an RF power supply voltage is not generated.

Figure 9:
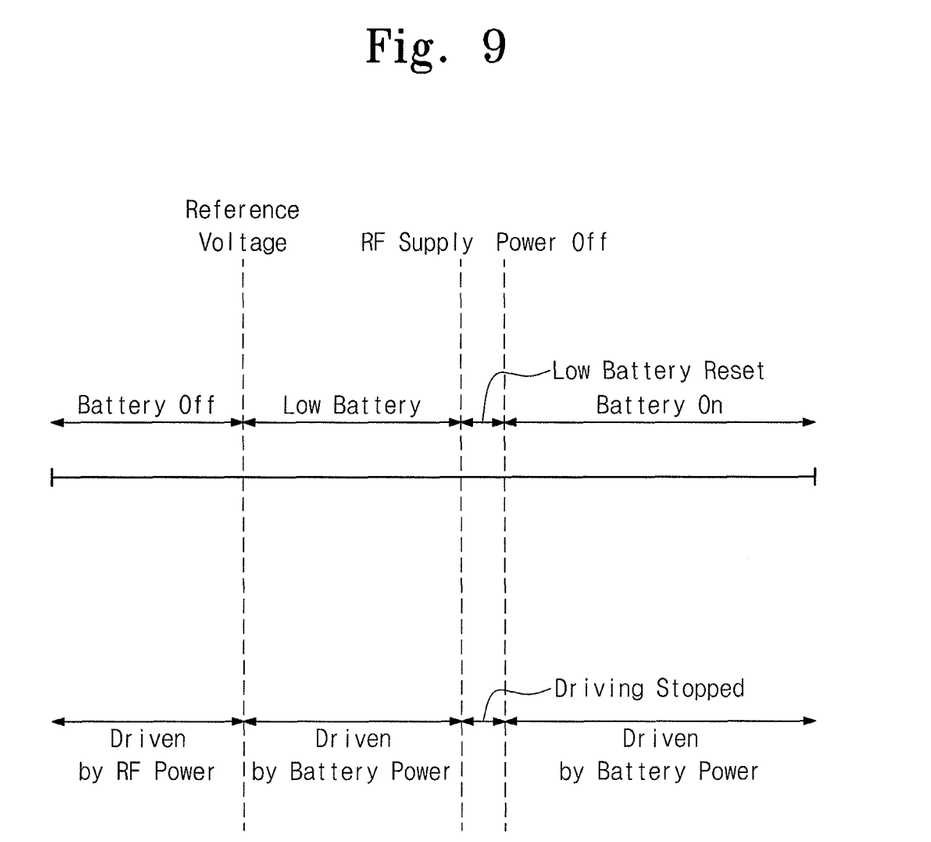
FIG. 9 illustrates a diagram of a power supply voltage used according to a mode of operation of an NFC device according to an embodiment.

FIG. 9 illustrates a diagram of a power supply voltage used according to a mode of operation of an NFC device according to an embodiment.

Referring to FIG. 9, an NFC device 110 according to an embodiment may operate using a power supply voltage supplied from a battery power unit 120 in a battery on mode. In a low battery reset mode, driving of the NFC device 110 may be instantly blocked. In a low battery mode, the NFC device 110 may operate using a power supply voltage supplied from the battery power unit 120. In a battery off mode, the NFC device 110 may operate using a power supply voltage supplied from an RF power unit 111.

That is, the NFC device 110 according to an embodiment may extend a usable time (or, a life) of a battery by using a low battery reset mode.

In an electronic apparatus 100 including the NFC device 110, current consumption of the electronic apparatus 110 may be minimized when the NFC device 110 operates in the low battery reset mode. That is, in the case that the NFC device 110 operates in the low battery reset mode, current consumption of the electronic apparatus 100 may be minimized compared with a case that the NFC device 110 operates in a low battery mode, a battery on mode, a battery off mode, or a standby mode.

Meanwhile, a power management method of an electronic apparatus including an NFC device according to an embodiment may be stored at a computer-readable storage medium as a program command which is executed through a variety of computers. For example, the computer-readable storage medium may include a magnetic medium such as a floppy disk or a magnetic tape, an optical medium such as CD-ROM or DVD, a magneto-optical medium such as a floptical medium, a hardware device (e.g., ROM, RAM, flash memory, etc.) configured to store and execute a program command, and so on. The program command may include a machine language code made by a complier as well as a high-level language code executable by a computer using an interpreter. The hardware device may be configured to operate as one or more software modules to perform an operation according to the embodiments, and vice versa.

By way of summary and review, functions of a mobile device may gradually increase for convenience of users. A mobile device that drives many hardware components with less power is desired. However, since internal components of the mobile device are driven using a limited battery power, a usable time of the battery power may become an important factor of the mobile device.

For example, when the mobile device is used as a payment means, power must be supplied to an NFC chip while the mobile device is powered off. Thus, power of a battery may be consumed when the mobile device is powered off and a usable time (lifetime) of the battery may be reduced. In particular, in case of a mobile device with a built in battery, the mobile device may be used in a state where a power is off. In a mobile device adopting the NFC technique, thus, it may be desirable to reduce power consumption of both an NFC device and the mobile device including the NFC device.

According to the embodiments described herein, the NFC device may have reduced power consumption, and thus may allow a life of the battery power unit to be extended.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A near field communication device, comprising:
an RF power generator that generates an RF power supply voltage through wireless communication with an external communication device;
a power detector that detects an output level of a battery connected to the near field communication device;
a driving controller that controls the near field communication device; and
a switching controller that controls a supply of a power supply voltage to the driving controller from the RF power generator or the battery, wherein the switching controller controls the supply of the power supply voltage based on at least one of:
the output level of the battery,
a power on/off state of an electronic apparatus including the near field communication device,
whether the electronic apparatus is connected to the battery, and
whether the RF power supply voltage is generated,
wherein the switching controller blocks the supply of the power supply voltage to the driving controller from the battery and electrically connects the RF power generator and the driving controller when:
the electronic apparatus is in a power off state,
the electronic apparatus is connected with the battery, and
the RF power supply voltage is not generated.

2. The near field communication device of claim 1, wherein:
the switching controller controls a first switch forming a supply path from the RF power generator to the driving controller and a second switch forming a supply path from the battery to the driving controller, and
when the electronic apparatus is in the power off state, the electronic apparatus is connected with the battery, and the RF power supply voltage is not generated, the first switch is closed and the second switch is opened.

3. The near field communication device of claim 2, wherein:
the switching controller controls the first and second switches in response to at least one of first to fourth control signals,
the first control signal is generated by detecting the output level of the battery,
the second control signal is generated by detecting the power on/off state of the electronic apparatus,
the third control signal is generated by detecting whether the electronic apparatus is connected with the battery, and
the fourth control signal is generated by detecting whether the RF power supply voltage is generated.

4. The near field communication device of claim 3, wherein, when the electronic apparatus is in the power off state, the battery is connected with the electronic apparatus, and the RF power supply voltage is generated, the switching controller opens the first switch and closes the second switch.

5. The near field communication device of claim 3, wherein, when the electronic apparatus is in a power on state, the battery is connected with the electronic apparatus, and the output level of the battery is higher than a reference voltage, the switching controller opens the first switch and closes the second switch.

6. The near field communication device of claim 3, wherein, when the electronic apparatus is in the power off state and the battery is not connected with the electronic apparatus, the switching controller closes the first switch and opens the second switch.

7. The near field communication device of claim 3, further comprising:
a power controller that controls whether the power supply voltage is supplied to the driving controller from the RF power generator or the battery, when the first and second switches are closed.

8. The near field communication device of claim 3, wherein when the first switch is closed and the second switch is opened, the driving controller controls a power supply voltage supplied to the power detector.

9. A power management method of an electronic apparatus including a near field communication device, the near field communication device including an RF power generator and a driving controller, the RF power generator to generate an RF power supply voltage through wireless communication with an external communication device, the driving controller to control the near field communication device, the method comprising:
blocking a supply of power from a battery to the near field communication device by controlling of a switching controller and electrically connecting the RF power generator and the driving controller when the electronic apparatus is connected with the battery, the electronic apparatus is powered off, and an RF power supply voltage of the near field communication device is not generated; and
deciding a power supply mode of the near field communication device in response to at least one of:
an output level of the battery,
a power on/off state of the electronic apparatus, and
a generation of the RF power supply voltage.

10. The power management method of claim 9, wherein deciding the power supply mode of the near field communication device includes setting the power supply mode to a battery off mode when the battery is not connected with the electronic apparatus.

11. The power management method of claim 9, wherein deciding the power supply mode of the near field communication device includes setting the power supply mode to a battery on mode when the electronic apparatus is in a power on state and the output level of the battery is higher than a reference voltage.

12. The power management method of claim 9, wherein deciding the power supply mode of the near field communication device includes setting the power supply mode to a battery off mode when the output level of the battery is lower than a reference voltage.

13. The power management method of claim 9, wherein deciding the power supply mode of the near field communication device includes setting the power supply mode to a low battery mode when the RF power supply voltage is generated.

14. The power management method of claim 13, wherein when the electronic apparatus is in a power on state and the output level of the battery is higher than a reference voltage, the power supply mode of the near field communication device is set to a battery on mode from a state where the near field communication device operates in the low battery mode.

15. The power management method of claim 13, wherein when the output level of the battery is lower than a reference voltage, the power supply mode of the near field communication device is set to a battery off mode from a state where the near field communication device operates in the low battery mode.

16. A near field communication device, comprising:
an RF power generator that generates an RF power supply voltage through wireless communication with an external communication device;

a driving controller that controls the near field communication device; and a switching controller that controls on/off operations of a first switch and a second switch, the first switch forming a supply path from the RF power generator to the driving controller and the second switch forming a supply path from a battery to the driving controller, wherein the switching controller closes the first switch and opens the second switch such that the driving controller is electrically disconnected from the battery and electrically connected to the RF power generator when:

an electronic apparatus connected to the near field communication device is in a power off state, the electronic apparatus is connected with the battery, and the RF power supply voltage is not generated.

17. The near field communication device of claim 16, wherein the switching controller opens the first switch and closes the second switch when:

the electronic apparatus is in the power off state, the electronic apparatus is connected with the battery, an output level of the battery is higher than a reference voltage, and the RF power supply voltage is generated.

18. The near field communication device of claim 16, wherein the switching controller opens the first switch and closes the second switch when the electronic apparatus in a power on state.

19. The near field communication device of claim 18, wherein the switching controller closes the first switch and opens the second switch when:

the electronic apparatus is not connected with the battery, or an output level of the battery is lower than a reference voltage.

20. The near field communication device of claim 1, wherein the near field communication device operates in first, second, third, and fourth battery modes, the first, second, third, and forth battery modes are determined according to first, second, third, and fourth control signals, wherein:

the first control signal is generated by detecting the output level of the battery, the second control signal is generated by detecting the power on/off state of the electronic apparatus, the third control signal is generated by detecting whether the electronic apparatus is connected with the battery, and the fourth control signal is generated by detecting whether the RF power supply voltage is generated.

* * * * *